(12) United States Patent
Takeuchi

(10) Patent No.: US 11,443,238 B2
(45) Date of Patent: Sep. 13, 2022

(54) COMPUTER SYSTEM AND PRESENTATION METHOD OF INFORMATION

(71) Applicant: Hitachi, Ltd., Tokyo (JP)

(72) Inventor: Wataru Takeuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 455 days.

(21) Appl. No.: 16/708,473

(22) Filed: Dec. 10, 2019

(65) Prior Publication Data
US 2020/0250579 A1 Aug. 6, 2020

(30) Foreign Application Priority Data
Feb. 6, 2019 (JP) .............................. JP2019-019357

(51) Int. Cl.
*G06N 20/00* (2019.01)
*G06F 16/22* (2019.01)
*G06N 5/04* (2006.01)

(52) U.S. Cl.
CPC ............. *G06N 20/00* (2019.01); *G06F 16/22* (2019.01); *G06N 5/04* (2013.01)

(58) Field of Classification Search
CPC .......... G06N 5/04; G06N 5/003; G06N 7/005; G06N 3/08; G06N 20/00; G06F 16/22
See application file for complete search history.

(56) References Cited

U.S. PATENT DOCUMENTS

| | | | | |
|---|---|---|---|---|
| 5,255,347 A | * | 10/1993 | Matsuba | G06N 3/0454 706/31 |
| 7,519,566 B2 | * | 4/2009 | Prigogin | G06Q 10/06 707/999.1 |
| 11,232,367 B1 | * | 1/2022 | Silberstein | G06N 7/005 |
| 11,244,402 B2 | * | 2/2022 | Lei | H04L 67/306 |
| 2005/0120009 A1 | * | 6/2005 | Aker | G06F 16/84 |
| 2006/0173663 A1 | * | 8/2006 | Langheier | G16H 50/50 703/11 |
| 2019/0286724 A1 | * | 9/2019 | Kudo | G06F 16/254 |

FOREIGN PATENT DOCUMENTS

JP  2011-227838 A  11/2011

OTHER PUBLICATIONS

Marco Tulio Ribeiro, et al, "Why Should I Trust You?", Explaining the Predictions of Any Classifier, KDD 2016 Proceedings of the 22nd ACM SIGKDD International Conference on Knowledge Discovery and Data Mining, Aug. 2016, pp. 1135-1144.

(Continued)

*Primary Examiner* — Abdullahi E Salad
(74) *Attorney, Agent, or Firm* — Mattingly & Malur, PC

(57) ABSTRACT

A computer system is accessible to a database storing learning data to generate a prediction model, the learning data includes input data and teacher data, the computer system: performs first learning to set an extraction criterion for extracting the learning data including the input data similar to prediction target data in a case of being input the prediction target data; extract the learning data from the first database based on the extraction criterion and generate a dataset; perform second learning to generate a prediction model using the dataset; generate a decision logic showing a prediction logic of the prediction model; and output information to present the decision logic.

15 Claims, 12 Drawing Sheets

(56) References Cited

OTHER PUBLICATIONS

Scott M. Lundberg, et al, "A Unified Approach to Interpreting Model Predictions", Advances in Neural Information Processing Systems 30, Dec. 2017, pp. 4765-4774.
R. Krishnan, et al., "Extracting decision trees from trained neural networks", Department of Computer Science and Engineering, Indian Institute of Technology, Powai, Mumbai 400 076, India, Pattern Recognition, vol. 32, Issue 12, Dec. 1999, pp. 1999-2009.
K.-L. Du, "Clustering: A neural network approach", Neural Networks 23, Aug. 29, 2009, pp. 89-107.

* cited by examiner

| | breast_cancer | digits | iris | wine | Average |
|---|---|---|---|---|---|
| GradientBoostingClassifier | 0.965 | 0.954 | 0.927 | 0.940 | 0.947 |
| DynamicDecisionTreeClassifier_NN50 | 0.937 | 0.924 | 0.954 | 0.917 | 0.933 |
| DynamicDecisionTreeClassifier_NN25 | 0.927 | 0.944 | 0.935 | 0.910 | 0.929 |
| DynamicDecisionTreeClassifier_NN10 | 0.948 | 0.950 | 0.928 | 0.835 | 0.915 |
| KNeighborsClassifier_NN25 | 0.920 | 0.957 | 0.937 | 0.686 | 0.875 |
| KNeighborsClassifier_NN10 | 0.939 | 0.973 | 0.918 | 0.647 | 0.869 |
| KNeighborsClassifier_NN50 | 0.918 | 0.934 | 0.892 | 0.707 | 0.863 |
| DecisionTreeClassifier | 0.920 | 0.848 | 0.918 | 0.857 | 0.886 |

FIG. 5

| 901 | 902 | 903 | 904 | 905 |
|---|---|---|---|---|
| PREDICTION TARGET DATA | PREDICTION MODEL | PREDICTIVE PERFORMANCE | PREDICTION RESULT | DECISION LOGIC |
| (x1,x2,x3,...) | prediction_model 1 | 91.2%, | L3a:11%, L3b:89%, | decision_logic1 |
| ⋮ | ⋮ | ⋮ | ⋮ | ⋮ |

COMPUTER SYSTEM AND PRESENTATION METHOD OF INFORMATION

CLAIM OF PRIORITY

The present application claims priority from Japanese patent application JP 2019-19357 filed on Feb. 6, 2019, the content of which is hereby incorporated by reference into this application.

BACKGROUND OF THE INVENTION

This invention relates to a system for predicting an event in a subject.

In recent years, a system so-called artificial intelligence (AI) for predicting an event in a subject has been provided in various fields such as city planning, medical treatment, and financial activities. For example, the AI is utilized in the medical field to predict a crisis rate of some disease (event) for a patient (subject) or to determine the medical care (event) such as interventional action or medical action recommended for the patient (subject).

The above-described system predicts an event in a subject based on a prediction model generated by machine learning using learning data. An example of a technique to generate a prediction model is described in JP 2011-227838 A.

JP 2011-227838 A states as follows: A prediction apparatus 54 comprises a prediction model storage device for storing a prediction model 18 composed of ADTree. When data of a group of characteristics extracted from case data are applied, the prediction model 138 is previously learned so as to predict occurrence of AxLN transfer or the like related to a patient. The prediction apparatus 54 further comprises a characteristic extraction part 152 for extracting the data of the group of characteristics from the case data to be diagnosed, and a model application part 156 for applying the data of the group of the characteristics extracted by the characteristic extraction part 152 to the prediction model, predicting the occurrence of the AxLN transfer or the like in the patient of the case data to be diagnosed and outputting the predicted result as prediction 154.

SUMMARY OF THE INVENTION

As the utilization of AI progresses, the demand for presenting the interpretation and explanation of the grounds of prediction results is increasing. However, the generated prediction models have complicated structures because of the recent advancement of the machine learning technology. Prediction models are black-boxed, causing difficulty in interpreting and explaining the grounds of prediction results output therefrom.

For example, when an interventional action is output from a prediction model, the grounds why the interventional action is recommended cannot be presented to a doctor, namely a user.

This invention provides a technique to generate a prediction model that shows high predictive performance but allows presentation of a prediction logic reproducible for the user.

A representative example of the present invention disclosed in this specification is as follows: a computer system comprises at least one computer, the computer system is accessible to a first database storing a plurality of pieces of learning data to generate a prediction model for predicting an event in a subject. Each of the plurality of pieces of learning data includes input data and teacher data, the input data including a plurality of feature values that are values of items representing characteristics of the subject. The at least one computer being configured to: perform first learning to set an extraction criterion for extracting learning data including input data similar to prediction target data which includes the plurality of feature values in a case of receiving the prediction target data; extract at least one of a piece of learning data from the first database based on the extraction criterion and generate a dataset including the extracted at least one of the piece of learning data as an element; perform second learning to generate a prediction model using the dataset; generate a decision logic showing a prediction logic of the prediction model based on the prediction model; and output first information to present the decision logic.

According to an aspect of this invention, it can generate a prediction model that shows high predictive performance but allows presentation of a prediction logic reproducible for the user. The problems, configurations, and effects other than those described above are clarified in the following description of the embodiments.

BRIEF DESCRIPTION OF THE DRAWINGS

The present invention can be appreciated by the description which follows in conjunction with the following figures, wherein:

FIG. 5 is a diagram showing an analysis of the predictive performance of a prediction model in Embodiment 1;

DETAILED DESCRIPTION OF THE EMBODIMENTS

Figure 1:
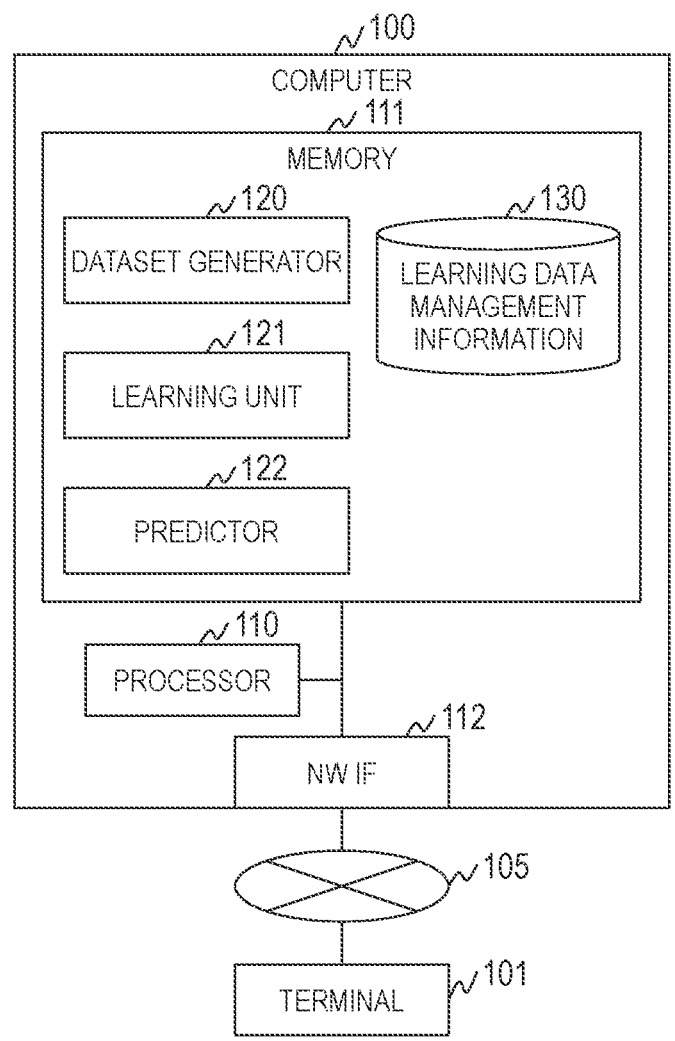
FIG. 1 is a diagram illustrating an example of the configuration of a computer system in Embodiment 1.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

Embodiment 1

FIG. 1 is a diagram illustrating an example of the configuration of a computer system in Embodiment 1.

The computer system includes a computer 100 and a terminal 101. The computer 100 and the terminal 101 are interconnected via a network 105 such as a wide area network (WAN) or a local area network (LAN). The connection of the network 105 may be either wired or wireless.

The terminal 101 is an apparatus to be operated by the user and includes a processor, a memory, a storage device, a network interface, an input device, and an output device, which are not shown. The input device may be a keyboard, a mouse, and/or a touch panel. The output device may be a monitor and/or a printer.

The computer 100 is a computer for predicting an event in a subject. For example, the computer 100 generates a prediction model 202 (see FIG. 2) for predicting a crisis rate of some disease (event) for a patient (subject) or determining a medical action recommended (event) for the patient (subject). The computer 100 outputs a prediction result using the prediction model 202 when prediction target data 200 is input.

This invention is not limited to a specific type of prediction model 202. The prediction model 202 may be of various types such as neural network, decision tree, Bayesian network, and linear model.

The computer 100 includes a processor 110, a memory 111, and a network interface 112. These hardware elements are interconnected by an internal bus. The computer 100 may have a storage device such as a hard disk drive (HDD) or a solid state drive (SSD). The computer 100 may also have an input device and/or an output device.

The processor 110 executes programs stored in the memory 111. The processor 110 operates as a function unit (module) for implementing a specific function by performing processing in accordance with a program. In the following description, when some processing is described using a function unit as an agent, it means that the processor 110 executes a program for implementing the function unit.

The memory 111 stores programs to be executed by the processor 110 and information to be used by the programs. The memory 111 also includes a work area to be used by the programs on a temporary basis.

The network interface 112 is an interface for the computer 100 to communicate with an external device via a network.

Now, the programs and information stored in the memory 111 are described. The memory 111 stores programs for implementing a dataset generator 120, a learning unit 121, and a predictor 122. The memory 111 further stores learning data management information 130.

The learning data management information 130 is information to manage the learning data to generate the prediction model 202 which is used by the predictor 121. A piece of learning data includes input data and teacher data. The learning data management information 130 includes a plurality of pieces of learning data. The input data included in the piece of learning data includes values (feature values) of a plurality of items representing a state of a subject. The items may be the age, the weight, and a test result of a patient and the feature values may be specific values such as 30, 60 kg, and positive. The teacher data included in the piece of learning data is data showing the ideal result output by processing the input data using the prediction model 202.

The dataset generator 120 generates a dataset 201 (see FIG. 2) of learning data to be used to generate a prediction model 202. The learning unit 121 performs machine learning using the dataset 201 generated by the dataset generator 120 to generate a prediction model 202. The predictor 122 performs prediction on prediction target data 200 with the prediction model 202.

The function units of the computer 100 may be a single integrated function unit; alternatively, a single function unit may be separated to a plurality of function units of individual functions. The function units of a computer 100 may be distributed in a plurality of computers 100.

Figure 2:
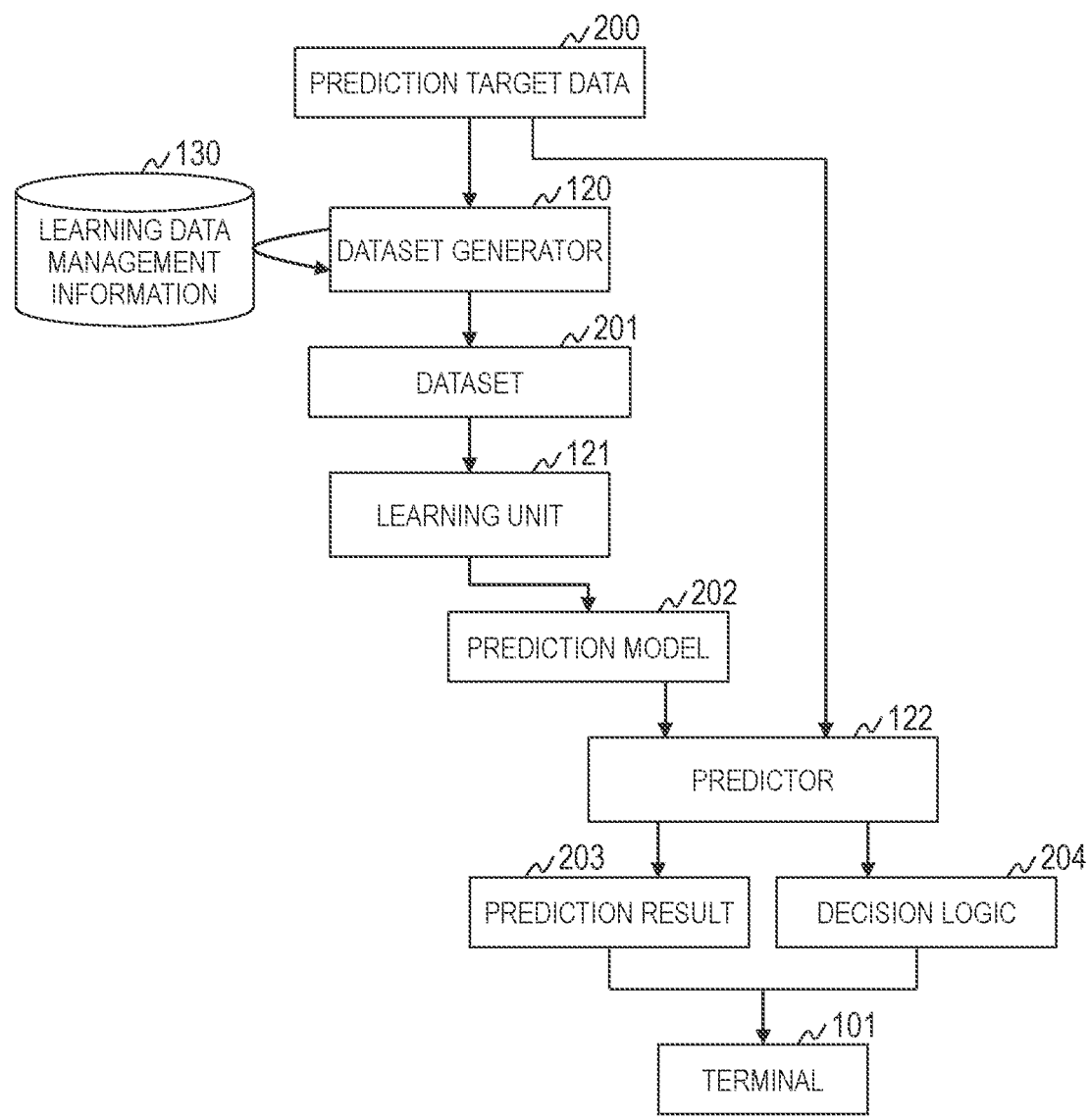
FIG. 2 is a diagram illustrating the processing flow of the computer system in Embodiment 1.

FIG. 2 is a diagram illustrating the processing flow of the computer system in Embodiment 1.

The computer 100 receives a prediction request including prediction target data 200 from the terminal 101. In response, the dataset generator 120 generates a dataset 201 based on the prediction target data 200 and the learning data management information 130. This invention has a feature in the generation of a dataset 201.

The learning unit 121 performs learning with the dataset 201 to generate a prediction model 202. The learning includes the following examples of processing. Processing 1: The learning unit 121 inputs input data included in learning data to the predictor 122 configured with an initial prediction model 202 and obtains a prediction result. Processing 2: The learning unit 121 modifies or updates the prediction model 202 so that the difference between the prediction result and the teacher data included in the learning data becomes smaller.

The predictor 122 calculates a prediction result 203 by processing the prediction target data 200 using the generated prediction model 202. The predictor 122 further generates a decision logic 204, which is a prediction logic reproducible for the user, based on the prediction model 202. The predictor 122 sends the prediction result 203 and the decision logic 204 to the terminal 101.

Figure 3:
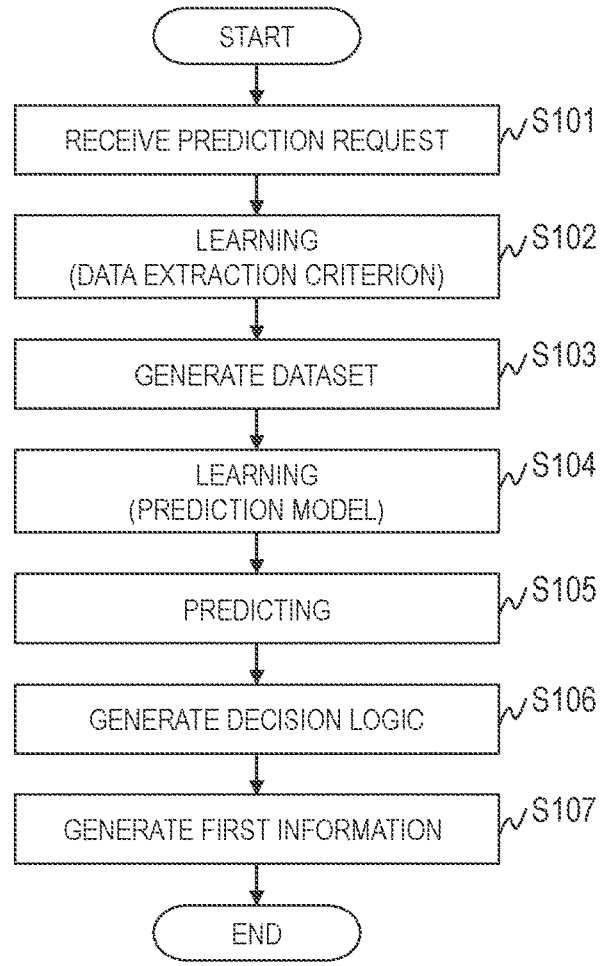
FIG. 3 is a flowchart of the processing to be performed by a computer in Embodiment 1.
Figure 4:
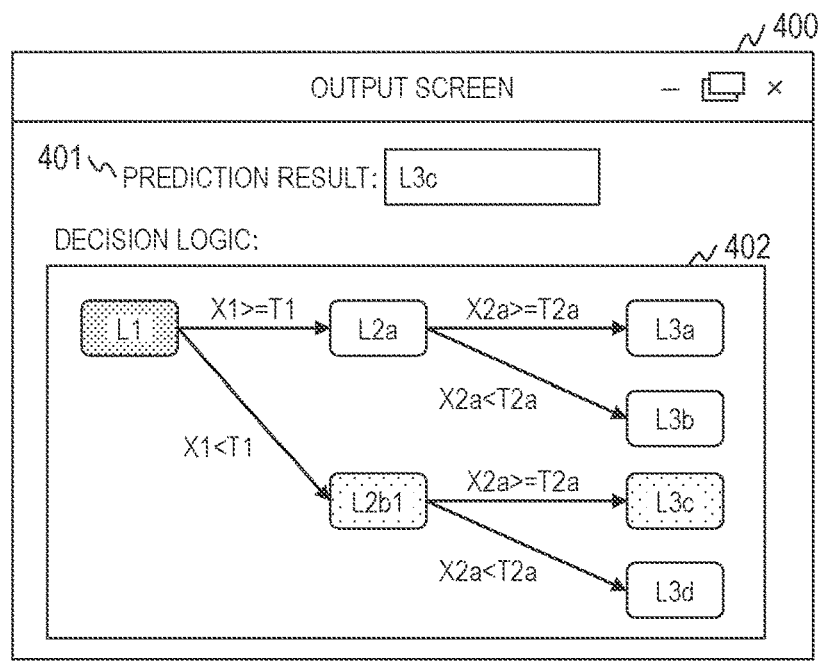
FIG. 4 is a diagram showing an example of a screen to be displayed on a terminal in Embodiment 1.

FIG. 3 is a flowchart illustrating the processing to be performed by the computer 100 in Embodiment 1. FIG. 4 is a diagram showing an example of a screen to be displayed on the terminal 101 in Embodiment 1. FIG. 5 is a diagram showing an analysis of the predictive performance of the prediction model 202 in Embodiment 1.

Upon receipt of a prediction request including prediction target data 200 from the terminal 101 (Step S101), the computer 100 performs learning to set a data extraction criterion to be used to generate a dataset (Step S102).

In Embodiment 1, the dataset generator 120 performs learning to generate the data extraction criterion using a k-nearest neighbor algorithm or a neural network.

<K-nearest neighbor algorithm> The dataset generator 120 applies a k-nearest neighbor algorithm to the learning data to calculate the values of the nearest neighbor search parameter (such as the Euclidian distance or the Mahalanobis' distance between data) for searching for learning data near the input data in the feature space. In the case where the nearest neighbor search parameter is the data-to-data distance, the data extraction criterion is determined depending on the distance between the data and the prediction target data 200.

<Neural network> The dataset generator 120 performs learning with a neural network, for example a neural network described in Clustering: A neural network approach (K.-L. Du) to cluster the learning data. In this case, the data extraction criterion is determined depending on the probabilities that the data belongs to individual clusters and the distances between the data and the centers of the individual clusters.

Next, the computer 100 generates a dataset 201 based on the data extraction criterion and the prediction target data 200 (Step S103).

Specifically, the dataset generator 120 identifies learning data neighboring the prediction target data 200 based on the data extraction criterion and generates the dataset 201 included of the identified learning data as an element.

Next, the computer 100 performs learning with the dataset 201 to generate a prediction model 202 (Step S104).

Specifically, the learning unit 121 performs leaning with the dataset 201. The learning unit 121 stores the generated prediction model 202 to the work area. Learning the prediction model 202 is a known technique and therefore, detailed description is omitted here.

Next, the computer 100 performs prediction on the prediction target data 200 with the prediction model 202 (Step S105).

Specifically, the predictor 122 processes the prediction target data 200 with the prediction model 202 to calculate a prediction result 203. The predictor 122 may also calculate the degrees of influence indicating the significance of individual feature values for the prediction result 203 using a technique of *"Why should I Trust You?": Explaining the Predictions of Any Classifier* (Marco Tulio Ribeiro et al.) or *A unified Approach to Interpreting Model Predictions* (Scott M. Lundberg, et al.), for example.

Next, the computer 100 generates a decision logic 204 (Step S106).

Specifically, the predictor 122 generates a decision logic 204 based on the prediction model 202. For example, the following decision logics 204 may be generated.

In the case where the prediction model 202 is a decision tree, the predictor 122 generates a graph with parameters representing the decision tree as the decision logic 204. In the case where the prediction model 202 is a Bayesian network, the predictor 122 generates a graph with parameters representing the Bayesian network as the decision logic 204. In the case where the prediction model 202 is a linear model, the predictor 122 generates a formula with parameters representing the linear model as the decision logic 204.

In the case where the prediction model 202 is a neural network, the predictor 122 extracts a decision tree from the neural network using the technique described in *Extracting decision trees from trained neural networks* (R. Krishnan, G. Sivakumar, et al.) and generates a graph with parameters representing the decision tree as the decision logic 204. Alternatively, the predictor 122 may generate a graph with parameters representing the neural network as the decision logic 204.

The foregoing decision logics 204 are examples and the decision logic 204 is not limited to those. For example, the generated decision logic 204 may be a matrix composed of rows and columns of items. Each cell in the matrix corresponds to a value representing the relevancy.

Next, the computer 100 generates first information to be presented (Step S107) and sends it to the terminal 101. Specifically, the processing as described as follows is performed.

The predictor 122 generates first information to present the prediction result 203 and the decision logic 204. The predictor 122 may generate information to present only either one of the prediction result 203 and the decision logic 204.

The predictor 122 stores learning data including of the prediction target data 200 as the input data and the prediction result as the teacher data to the learning data management information 130. Since this embodiment is configured to update the learning data management information 130, the processing of Step S102 is performed every time prediction is performed.

The learning to generate the data extraction criterion may be skipped unless this processing needs to be repeated. In this case, the processing of Step S102 is omitted and processing using the result of previous learning is performed. The foregoing is the description of the processing of Step S107.

Upon receipt of the first information, the terminal 101 displays an output screen 400 as shown in FIG. 4. The output screen 400 includes a prediction result display field 401 for displaying the prediction result 203 and a decision logic display field 402 for displaying the decision logic 204.

The output screen 400 shown in FIG. 4 is an example and the output screen is not limited to this. The output screen 400 may include another display field and/or an operation button.

The prediction model 202 generated in Embodiment 1 has features as described as follows.

<Feature 1> The learning data included in a dataset 201 is located near the prediction target data 200 in the feature space, which means that the learning data has high similarity to the prediction target data 200. Accordingly, the number of items that affect the prediction is limited. Accordingly, the generated prediction model 202 has a simpler structure than a prediction model generated using all learning data. Further, the calculating cost to generate the prediction model 202 is low.

For example, in the case where the prediction model 202 is a decision tree, the number of features constituting the decision tree and the number of links connecting the features are small. Such the decision tree may be presented as a prediction logic reproducible for the user.

<Feature 2> The learning data included in a dataset 201 is similar to the prediction target data 200 and characterized in given features. Accordingly, the prediction model 202 generated based on the dataset 201 may provide accurate prediction based on the differences in the given features.

Now, prediction performance of the prediction model 202 in Embodiment 1 is described using FIG. 5. FIG. 5 includes evaluations of prediction performance of prediction models using scikit-learn, which is a machine learning library.

The row of "GradientBoostingClassifier" indicates the prediction performance of a prediction model generated from the dataset generated based on gradient boosting. Each row of "DynamicDecisionTreeClassifier" indicates the prediction performance of the prediction model 202 in Embodiment 1. NN50, NN25, and NN10 represent the numbers of learning data included in the dataset 201 (50, 25, and 10, respectively). Each row of "KNeighborsClassifier" indicates the prediction performance of a prediction model generated from a dataset generated by a k-nearest neighbor algorithm. The row of "DecisionTree Classifier" indicates the prediction performance of a prediction model generated from a dataset generated based on a decision tree.

As noted from FIG. 5, the prediction performance of the prediction model 202 in Embodiment 1 is sufficiently high.

Embodiment 1 enables generation of a prediction model showing high prediction performance but allowing its prediction logic to be reproducible for the user.

Embodiment 2

In Embodiment 2, the computer 100 presents information on the extraction criterion and information on the dataset 201 with the terminal 101. Hereinafter, Embodiment 2 is described mainly in the differences from Embodiment 1.

The configuration of the computer system in Embodiment 2 is the same as the one in Embodiment 1. The configuration of the computer 100 in Embodiment 2 is the same as the one in Embodiment 1. The processing performed by the computer 100 is partially different in Embodiment 2.

Figure 6:
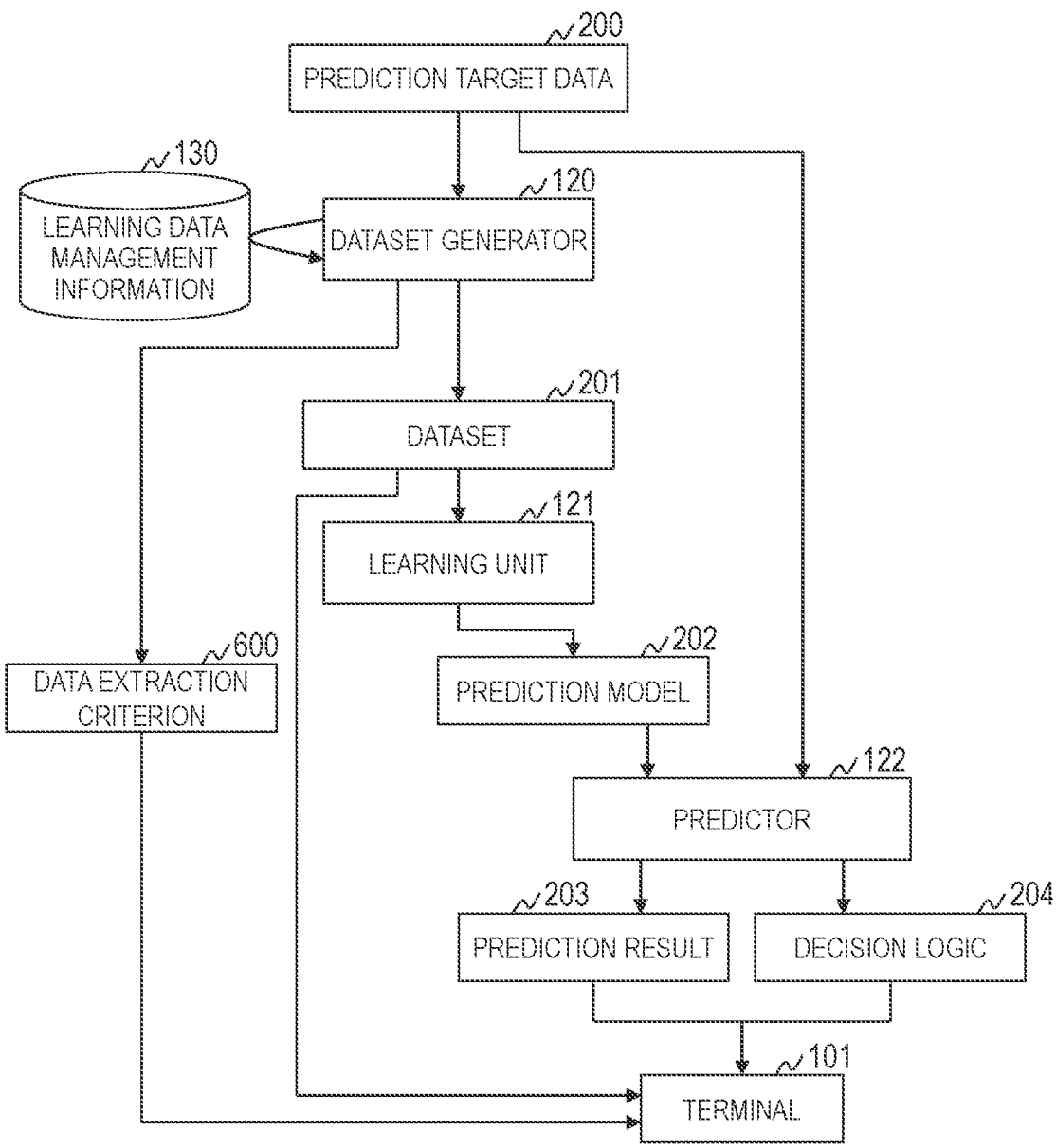
FIG. 6 is a diagram illustrating the processing flow of the computer system in Embodiment 2.

FIG. 6 is a diagram illustrating the processing flow of the computer system in Embodiment 2.

The dataset generator 120 in Embodiment 2 sends information on the data extraction criterion 600 and the dataset 201 to the terminal 101. The remaining is the same as the processing in Embodiment 1.

Figure 7:
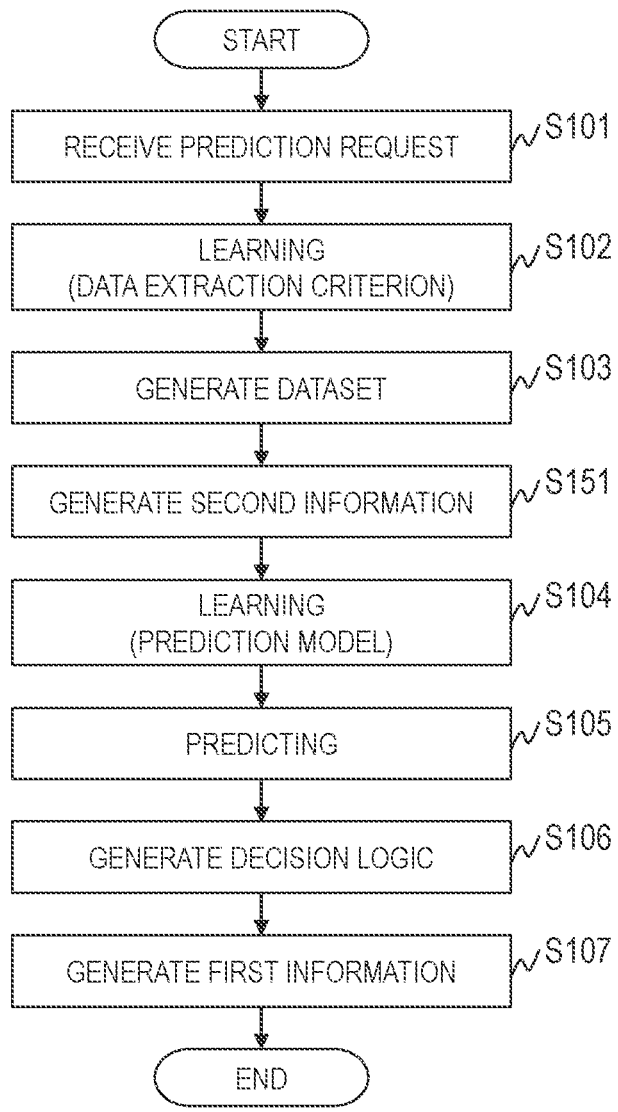
FIG. 7 is a flowchart of the processing to be performed by the computer in Embodiment 2.

FIG. 7 is a flowchart of the processing to be performed by the computer 100 in Embodiment 2.

In Embodiment 2, after the processing of Step S103, the computer 100 generates second information to be presented (Step S151) and sends it to the terminal 101.

Specifically, the dataset generator 120 generates second information to present information on the data extraction criterion 600 and information on the dataset 201 and sends it to the terminal 101. The information on the data extraction criterion 600 may include not only the data extraction criterion 600 but also information on the item significantly influencing (contributing to) the determination of the similarity of data. For example, it may include the degrees of influence of items to the prediction result to be output from the predictor.

Embodiment 2 enables the user to interpret the prediction result 203 and the decision logic 204 more clearly through the presented information about the dataset 201.

For example, a doctor of a user can identify the patients having similar characteristics or symptoms. Furthermore, the doctor can construct a decision logic by himself or herself with reference to the dataset 201 and check the points in common with or similar to the decision logic 204 output from the computer 100.

Embodiment 3

In Embodiment 3, the computer 100 integrates decision logics 204 generated previously. Hereinafter, Embodiment 3 is described mainly in the differences from Embodiment 1.

Figures 8, 9:
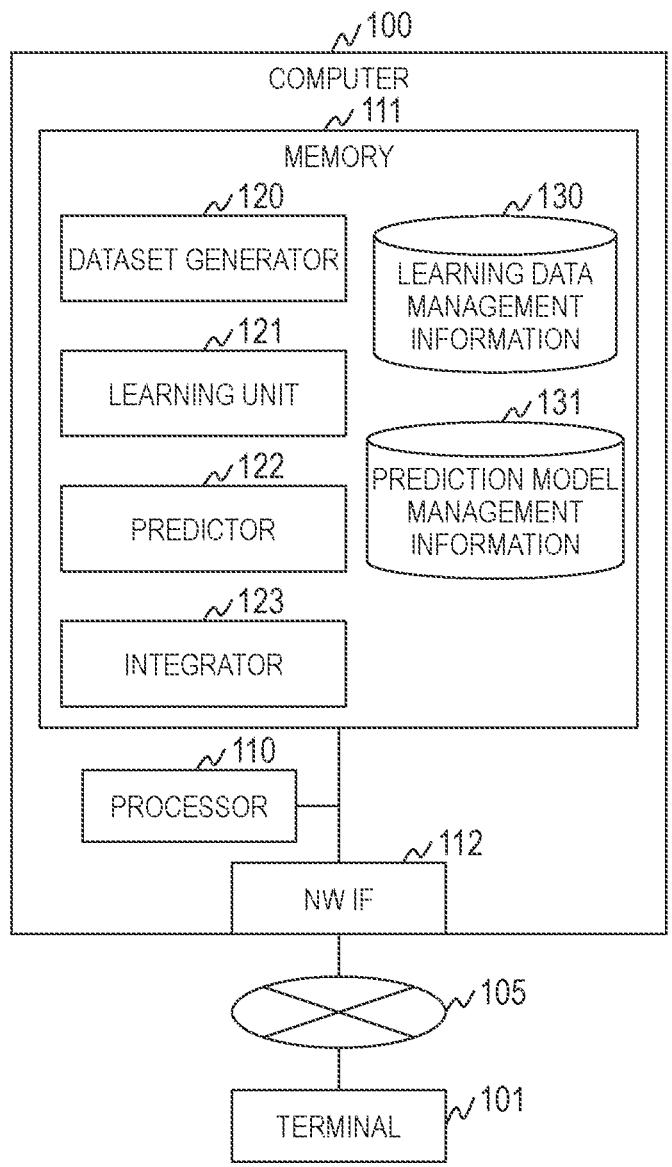
FIG. 8 is a diagram illustrating an example of the configuration of the computer system in Embodiment 3.
FIG. 9 is a diagram illustrating the data structure of prediction model management information in Embodiment 3.

FIG. 8 is a diagram illustrating an example of the configuration of a computer system in Embodiment 3.

The configuration of the computer system in Embodiment 3 is the same as the one in Embodiment 1. The hardware configurations of the computer 100 and the terminal 101 in Embodiment 3 are the same as those in Embodiment 1. In Embodiment 3, the functional configuration of the computer 100 is different.

The memory 111 of the computer 100 stores a program for implementing an integrator 123 and further, stores a prediction model management information 131.

The integrator 123 generates an integrated decision logic 1000 (see FIG. 10) by integrating a plurality of decision logics 204. The prediction model management information 131 is information for managing prediction models 202 and decision logics 204.

FIG. 9 is a diagram illustrating the data structure of the prediction model management information 131 in Embodiment 3.

The prediction model management information 131 stores entries each including a prediction target data 901, a prediction model 902, a predictive performance 903, a prediction result 904, and a decision logic 905. One entry is provided for one prediction model 202.

The prediction target data 901 is a field for storing the prediction target data 200. The prediction model 902 is a field for storing the prediction model 202. The predictive performance 903 is a field for storing the predictive performance of the prediction model 202. The prediction result 904 is a field for storing the result of prediction on the prediction target data 200. The decision logic 905 is a field for storing a decision logic 204.

In this connection, the computer 100 may further include a search unit for searching the prediction model management information 131 to present a search result based on a search request including a search key such as the prediction target data 200, and the predictive performance.

Figure 10:
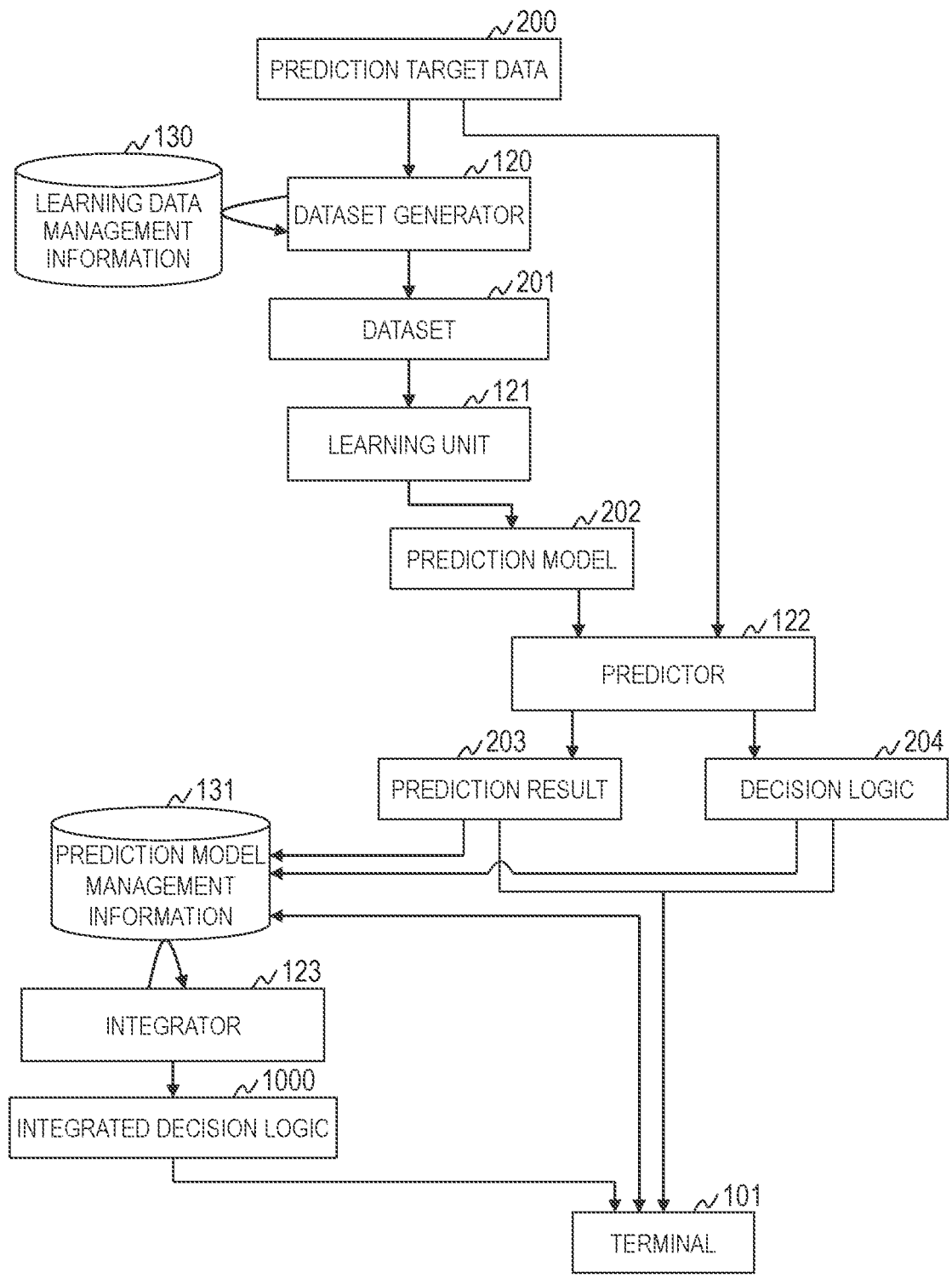
FIG. 10 is a diagram illustrating the processing flow of the computer system in Embodiment 3.

FIG. 10 is a diagram illustrating the processing flow of the computer system in Embodiment 3.

In Embodiment 3, the predictor 122 stores the prediction model 202, the prediction result 203, and the decision logic 204 to the prediction model management information 131.

In Embodiment 3, the integrator 123 refers to the prediction model management information 131 at an appropriate time and identifies decision logics 204 that can be integrated. The integrator 123 integrates the identified decision logics 204 to generate an integrated decision logic 1000 and sends it to the terminal 101.

Figure 11:
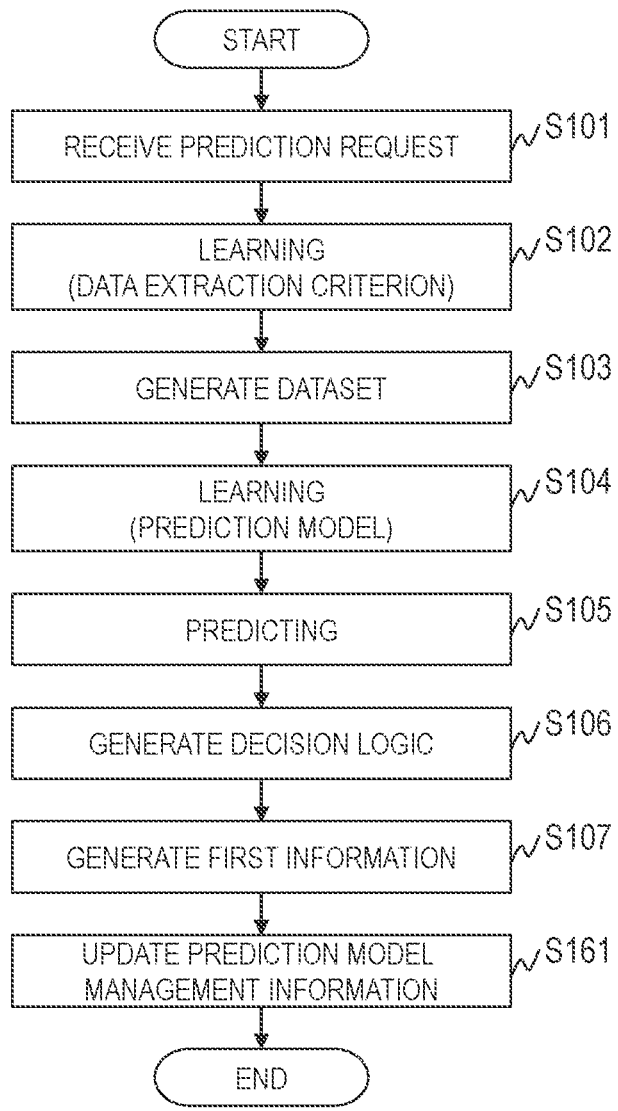
FIG. 11 is a flowchart of the processing to be performed by the computer in Embodiment 3.

FIG. 11 is a flowchart of the processing to be performed by the computer 100 in Embodiment 3.

At Step S104 in Embodiment 3, the learning unit 121 measures the predictive performance of the generated prediction model 202 and stores the prediction model 202 with the measured predictive performance to the work area.

After Step S107, the computer 100 updates the prediction model management information 131 (Step S161).

Specifically, the predictor 122 adds an entry to the prediction model management information 131, stores the prediction target data 200 and the prediction result 203 to the prediction target data 901 and the prediction result 904, respectively, of the added entry. The predictor 122 stores the prediction model 202 and the predictive performance of the prediction model 202 to the prediction model 902 and the predictive performance 903, respectively, of the added entry. The predictor 122 further stores the decision logic 204 to the decision logic 905 of the added entry.

Figure 12:
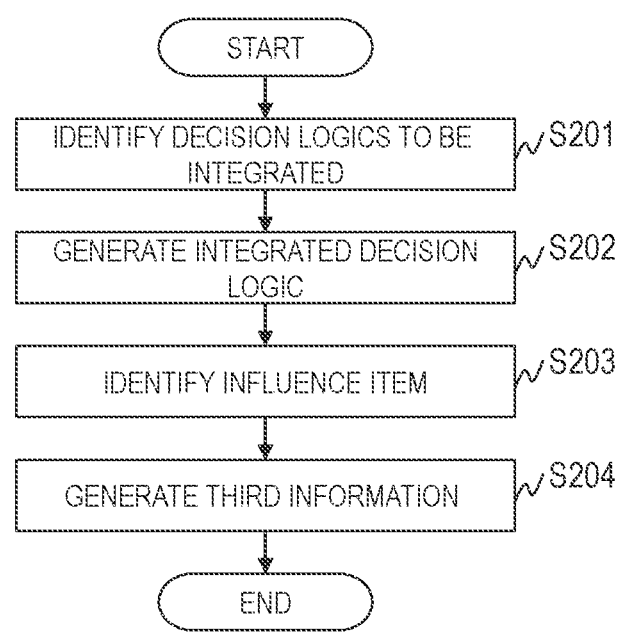
FIG. 12 is a flowchart of the processing to be performed by the computer in Embodiment 3.
Figure 13A:
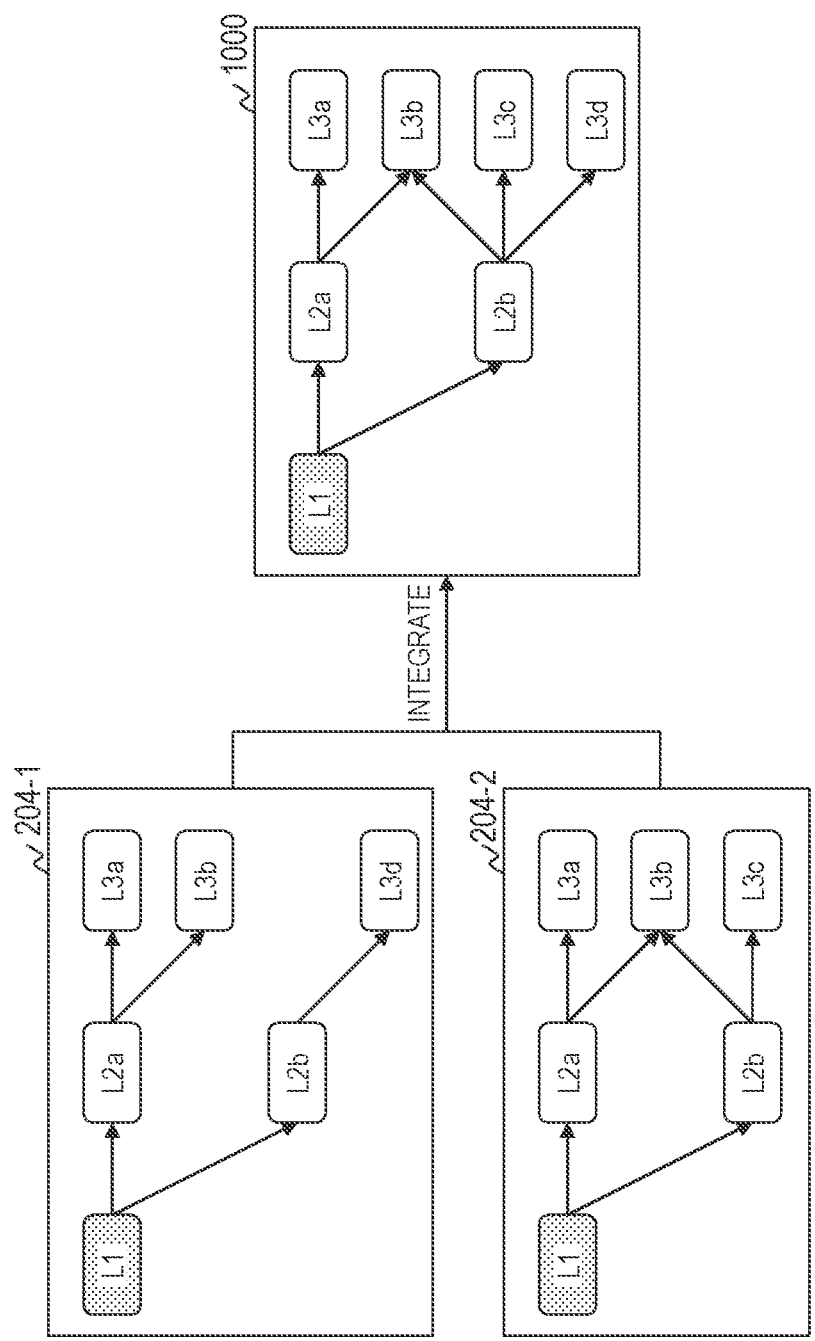
FIGS. 13A and 13B are diagrams illustrating examples of integration of decision logics in Embodiment 3.
Figure 13B:
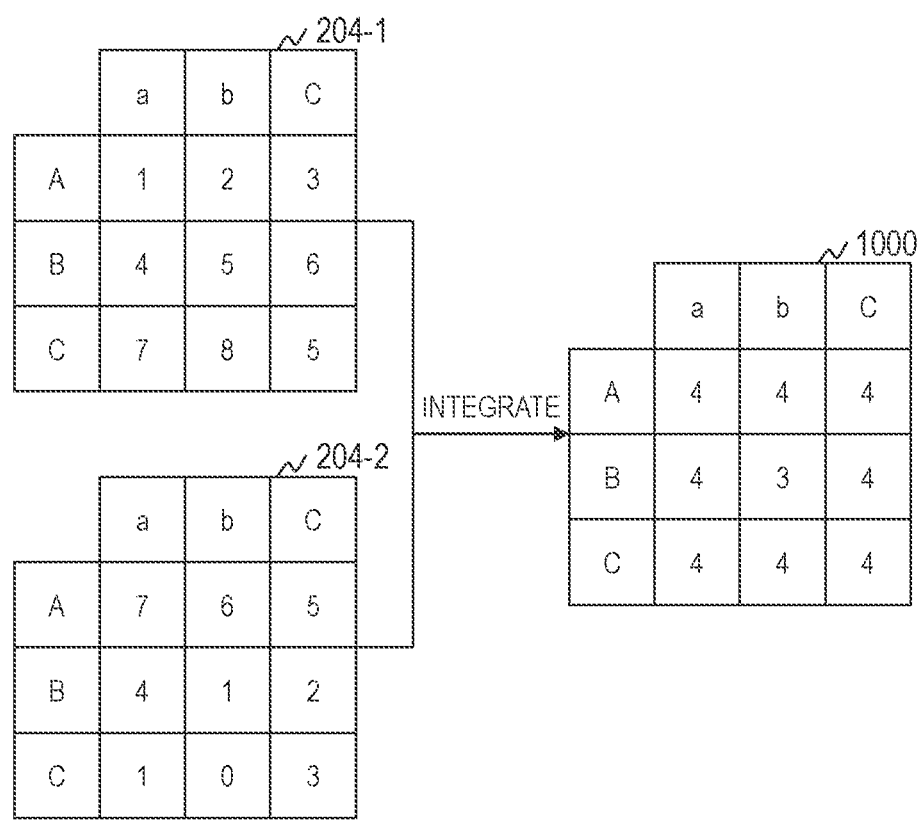

FIG. 12 is a flowchart of the processing to be performed by the computer 100 in Embodiment 3. FIGS. 13A and 13B are diagrams illustrating examples of integration of decision logics 204 in Embodiment 3.

Upon receipt of an integration request from the terminal 101, the computer 100 starts the following processing. The integration request includes information on integration conditions specifying the conditions to integrate decision logics

204. The computer 100 may perform the processing illustrated in FIG. 12 in parallel to prediction on prediction target data 200.

The computer 100 refers to the prediction model management information 131 to identify the decision logics 204 to be integrated based on the integration condition information (Step S201).

For example, in the case where the integration condition information specifies that the decision logics 204 of the prediction models 202 showing predictive performance of 80% or more are to be selected, the integrator 123 selects the entries showing that the predictive performance 903 is 80% or more.

Next, the computer 100 integrates the identified decision logics 204 to generate the integrated decision logic 1000 (Step S202).

For example, in the case where the decision logic (decision tree) 204-1 and the decision logic (decision tree) 204-2 as shown in FIG. 13A are identified, the integrator 123 generates a sum set of the two decision logics 204-1 and 204-2 as an integrated decision logic 1000. In another case where the decision logic (matrix) 204-1 and the decision logic (matrix) 204-2 as shown in FIG. 13B are identified, the integrator 123 calculates weighted averages to integrate the two decision logics 204-1 and 204-2 into an integrated decision logic 1000.

Depending on the type of the generated decision logics 204, various integration methods may be employed. For example, a plurality of decision logics 204 may be integrated by generating a sum set or a product set. Also, a plurality of decision logics 204 may be integrated by calculating weighted sums or weighted averages.

Next, the computer 100 identifies items that significantly influences the prediction based on the integrated decision logic 1000 as influence items (Step S203).

For example, in the case where the integrated decision logic 1000 is a decision tree, the integrator 123 identifies that the item corresponding to the node having a large number of branches on the lower layers is an influence item. In the case where the integrated decision logic 1000 is a neural network, the integrator 123 identifies that the item of an input layer having a weight coefficient larger than a threshold is an influence item. In the case where the integrated decision logic 1000 is a linear model, the integrator 123 identifies that the item corresponding to a term of the formula having a coefficient larger than a threshold is an influence item.

Next, the computer 100 generates third information to present the integrated decision logic 1000 and the relevant items (Step S204) and sends it to the terminal 101.

Embodiment 3 enables reproduction of an accurate and complicated prediction logic obtained by integrating a plurality of decision logics 204. The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system comprising at least one computer, the computer system being accessible to a first database storing a plurality of pieces of learning data to generate a prediction model for predicting an event in a subject, each of the plurality of pieces of learning data including input data and teacher data, the input data including a plurality of feature values that are values of items representing characteristics of the subject, and the at least one computer being configured to:

perform first learning to set an extraction criterion for extracting learning data including the input data similar to prediction target data which includes the plurality of feature values in a case of being input the prediction target data;

extract at least one of a piece of learning data from the first database based on the extraction criterion and generate a dataset including the extracted at least one of the piece of learning data as an element;

perform second learning to generate a prediction model using the dataset;

generate a decision logic showing a prediction logic of the prediction model based on the prediction model; and output first information to present the decision logic.

2. The computer system according to claim 1, wherein the at least one computer is configured to calculate a prediction result by processing the prediction target data by using the prediction model, and wherein the first information includes the prediction result.

3. The computer system according to claim 1, wherein the at least one computer is configured to store a new piece of learning data including the prediction target data as the input data and a prediction result as the teacher data to the first database.

4. The computer system according to claim 1, wherein the decision logic is information representing one of a decision tree, a Bayesian network, a linear model, and a neural network.

5. The computer system according to claim 1, wherein the at least one computer is configured to output second information to present at least either one of information on a result of the first learning and information on the dataset.

6. The computer system according to claim 1,
wherein the computer system is accessible to a second database storing a plurality of decision logics, and
wherein the at least one computer is configured to:
analyze the plurality of decision logics stored in the second database to identify a plurality of decision logics to be integrated;
integrate the identified plurality of decision logics to be integrated to generate an integrated decision logic; and
output third information to present the integrated decision logic.

7. The computer system according to claim 6,
wherein the at least one computer is configured to analyze the integrated decision logic to identify, from the prediction target data, at least one item that significantly influences prediction as an influence item, and
wherein the third information includes information on the influence item.

8. The computer system according to claim 1,
wherein the input data and the prediction target data are each data including a plurality of feature values required to generate a prediction model for predicting an interventional action.

9. A presentation method of information to be performed by a computer system,
the computer system including at least one computer and being accessible to a first database storing a plurality of pieces of learning data to generate a prediction model for predicting an event in a subject,
each of the plurality of pieces of learning data including input data and teacher data, the input data including a plurality of feature values that are values of items representing characteristics of the subject, and
the presentation method of information including:
a step of performing, by the at least one computer, first learning to set an extraction criterion for extracting learning data including the input data similar to prediction target data which includes the plurality of feature values in a case of being input the prediction target data;
a step of extracting, by the at least one computer, at least one on a piece of learning data from the first database based on the extraction criterion and generating a dataset including the extracted at least one of the piece of learning data;
a step of performing, by the at least one computer, second learning to generate a prediction model using the dataset;
a step of generating, by the at least one computer, a decision logic showing a prediction logic of the prediction model based on the prediction model; and
a step of outputting, by the at least one computer, first information to present the decision logic.

10. The presentation method of information according to claim 9, further including a step of calculating, by the at least one computer, a prediction result by processing the prediction target data by using the prediction model,
wherein the first information includes the prediction result.

11. The presentation method of information according to claim 9, further including a step of storing, by the at least one computer, a new piece of learning data including the prediction target data as the input data and a prediction result as the teacher data to the first database.

12. The presentation method of information according to claim 9, wherein the decision logic is information representing one of a decision tree, a Bayesian network, a linear model, and a neural network.

13. The presentation method of information according to claim 9, further including a step of outputting, by the at least one computer, second information to present at least either one of information on a result of the first learning and information on the dataset.

14. The presentation method of information according to claim 9,
wherein the computer system is accessible to a second database storing a plurality of decision logics, and
wherein the presentation method of information further includes:
a step of analyzing, by the at least one computer, the plurality of decision logics stored in the second database to identify a plurality of decision logics to be integrated;
a step of integrating, by the at least one computer, the identified plurality of decision logics to be integrated to generate an integrated decision logic;
a step of analyzing, by the at least one computer, the integrated decision logic to identify, from the prediction target data, at least one item that significantly influences prediction as an influence item; and
a step of outputting, by the at least one computer, third information to present the integrated decision logic and information on the influence item.

15. The presentation method of information according to claim 9, wherein the input data and the prediction target data are each data including a plurality of feature values required to generate a prediction model for predicting an interventional action.

* * * * *